(12) United States Patent
Dreischarf et al.

(10) Patent No.: US 6,584,883 B2
(45) Date of Patent: Jul. 1, 2003

(54) PNEUMATIC BRAKE BOOSTER

(75) Inventors: Derek T. Dreischarf, Kettering, OH (US); Michael W. Fanelli, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/974,612

(22) Filed: Oct. 9, 2001

(65) Prior Publication Data

US 2003/0066416 A1 Apr. 10, 2003

(51) Int. Cl.$^7$ .................................................. F15B 9/10
(52) U.S. Cl. ....................................................... 91/369.3
(58) Field of Search .............................. 91/369.2, 369.3

(56) References Cited

U.S. PATENT DOCUMENTS

| | | | | |
|---|---|---|---|---|
| 5,893,316 | A | * | 4/1999 | Inoue et al. ................ 91/369.2 |
| 6,109,164 | A | | 8/2000 | Okuhara et al. |
| 6,186,042 | B1 | | 2/2001 | Levrai et al. ............... 91/369.2 |
| 6,192,783 | B1 | * | 2/2001 | Tobisawa ................... 91/369.2 |
| 6,422,124 | B1 | * | 7/2002 | Schonlau et al. ........... 91/369.3 |

FOREIGN PATENT DOCUMENTS

WO    WO 0030946    6/2000

* cited by examiner

Primary Examiner—F. Daniel Lopez
(74) Attorney, Agent, or Firm—Scott A. McBain

(57) ABSTRACT

A pneumatic brake booster includes a generally cylindrical shaped piston. The piston has a first piston end and a second piston end and defines a chamber at the first piston end and a piston bore at the second piston end separated by an air flow aperture. The piston bore includes a plunger aperture located at the second piston end. A plunger includes a first plunger end and a second plunger end and is movable between first and second positions. The second plunger end is located within the plunger aperture. An air valve has a first valve end and a valve second end and is movable between first and second positions and defines a valve bore for receiving the first plunger end. A collapsing spring is located within the valve bore and is adapted to couple the plunger and the air valve. The plunger and air valve are spaced apart a first relative distance in response to the pneumatic brake booster being in a regular apply mode and spaced apart a second relative distance in response to the pneumatic brake booster being in a panic apply mode.

29 Claims, 7 Drawing Sheets

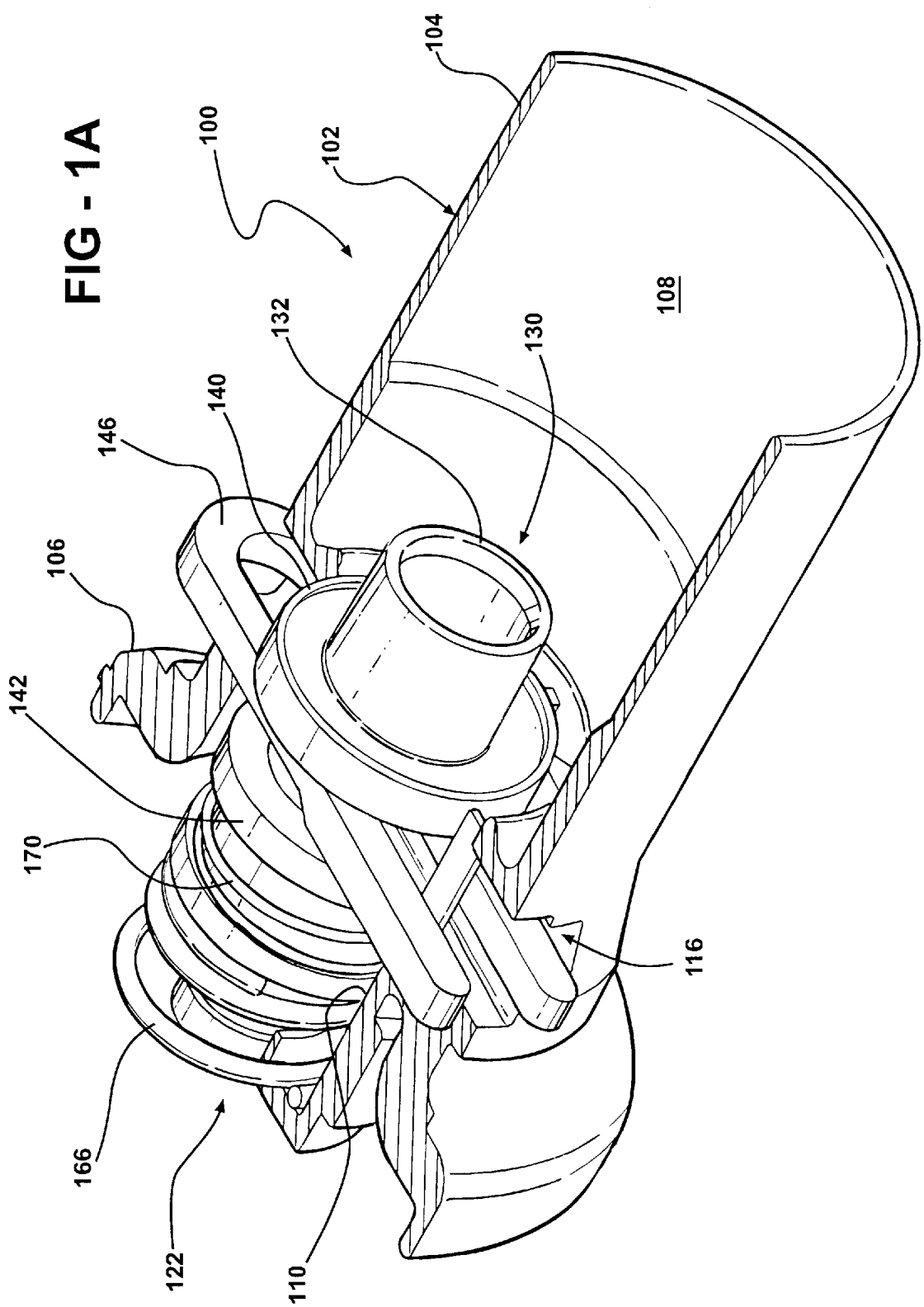

PNEUMATIC BRAKE BOOSTER

BACKGROUND OF THE INVENTION

1. Field of the Invention

The present invention relates generally to pneumatic brake boosters, and more particularly to a pneumatic brake booster with an air valve and a collapsing plunger.

2. Background of the Invention

In the design and manufacture of automobiles brake systems, decreasing the stopping distance of the vehicle when the brakes have been applied has frequently been a focus. Systems have been developed to generate maximum braking power within a fraction of a second, depending on the input rate from the driver.

Typically, panic devices located within the brake booster are used to accomplish this function. The brake booster amplifies the input force applied by the driver's foot on the brake pedal. A brake booster is comprised of front and rear chambers which are housed within a sealed volume. The front and rear chambers are separated by a flexible diaphragm membrane which prevents any type of pressure communication between the two chambers. In addition, brake boosters contain an input member of which the vehicle operator uses to engage the brake booster. When the braking system is at-rest, i.e., the driver's foot is off the brake pedal, both front and rear chambers are evacuated and in equilibrium. When the driver actuates the brake pedal, a mechanical valve is opened which allows air to flow into the rear chamber creating a pressure differential across the membrane.

This pressure differential acts over the membrane area and thus creates an output boost force which is generated on the piston reaction surface. The output force of the booster is the input force (from the brake pedal) plus the boost force. In this manner, the force of the driver's foot on the brake pedal is boosted to improve the force required of the driver for a deceleration.

Modern pneumatic brake boosters create a feedback force which acts in the opposite direction of the output force. The feedback force is transmitted through the brake pedal and gives the driver an indication of the current brake force. The feedback force is generated from the pressure and extrusion of the elastomer reaction disc acting in such a way as to close off the working diaphragm chambers from atmospheric pressure and allows the chambers to evacuate, thus reducing the output force. The feedback force is dependent upon the output force and increases as the output force increases. Such a system works sufficiently for average brake apply conditions. However, in an emergency condition where a short braking distance is critical, the feedback force may act to increase the braking distance by creating additional force required by the driver of the vehicle.

Several systems have been designed to reduce or eliminate the feedback force in emergency situations. For example, U.S. Pat. No. 6,186,042 issued Feb. 13, 2001 to Roland Levrai et al (hereafter "Levrai") discloses a "latching" type brake booster. The Levrai booster allows a braking force to be maintained even if the operator terminates the input force (removes his/her foot from the brake pedal) by locking the air valve position relative to the power piston if an emergency condition is detected. This, however, is undesirable since it removes control from the driver and gives no feedback with respect to status of the brake system.

U.S. Pat. No. 6,109,164 issued Aug. 29, 2000 to Hisakazu Okuhura et al (hereafter "Okuhura") discloses a brake booster which reduces the feedback force in the case of an emergency by varying the angles of loading surfaces which changes the amount of force being transferred to the power piston.

PCT Application WO 00/30946 published Jun. 24, 1999 and naming as an inventor Christopher Voss (hereafter "Voss") discloses a brake booster which reduces the feedback force in the case of an emergency by modifying the size of an orifice through which a reaction disk transmits the feedback force.

However, both of these types of systems are difficult and expensive to manufacture. The present invention is aimed at one or more of the problems identified above.

SUMMARY OF THE INVENTION

In one aspect of the present invention, a pneumatic brake booster is provided. The pneumatic brake booster includes a generally cylindrical shaped piston having a first piston end and a second piston end. The piston defines a chamber at the first piston end and a piston bore at the second piston end separated by an air flow aperture. The piston bore has a plunger aperture located at the second piston end. The pneumatic brake booster also includes a plunger having a first plunger end and a second plunger end. The plunger is moveable between first and second positions and is located within the plunger aperture. An air valve has a first valve end and a second valve end and is moveable between first and second positions and defines a valve bore for receiving the first plunger end. A collapsing spring is located within the valve bore and is adapted to couple the plunger and the air valve. The plunger and the air valve are spaced apart a first relative distance in response to the pneumatic brake booster being in a regular apply mode and spaced apart a second relative distance in response to the pneumatic brake booster being in a panic apply mode.

In another aspect of the present invention, a pneumatic brake booster, is provided. The pneumatic brake booster includes a generally cylindrical shaped piston having a first piston end and a second piston end. The piston defines a chamber at the first piston end and a piston bore at the second piston end separated by an air flow aperture. The piston bore has a plunger aperture located at the second piston end. The pneumatic brake booster further includes a plunger, an air valve, and a sleeve. The plunger has a first plunger end and a second plunger end and is moveable between first and second positions. The second plunger end is located within the plunger aperture. The plunger includes a plunger trench which is located near the first end of the plunger. The air valve has a first valve end and a second valve end. The second valve end includes a bearing aperture and defines a valve bore for receiving the first plunger end. The sleeve includes a sleeve bore for receiving the second valve end and includes a sleeve trench located around an interior surface of the sleeve. The pneumatic brake booster further includes at least one ball bearing located within the bearing aperture and being adapted to fit alternatively in the plunger trench or the sleeve trench.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a three-dimensional cut-away view of a pneumatic brake booster, according to an embodiment of the present invention;

DETAILED DESCRIPTION OF THE PREFERRED EMBODIMENT

Figure 1B:
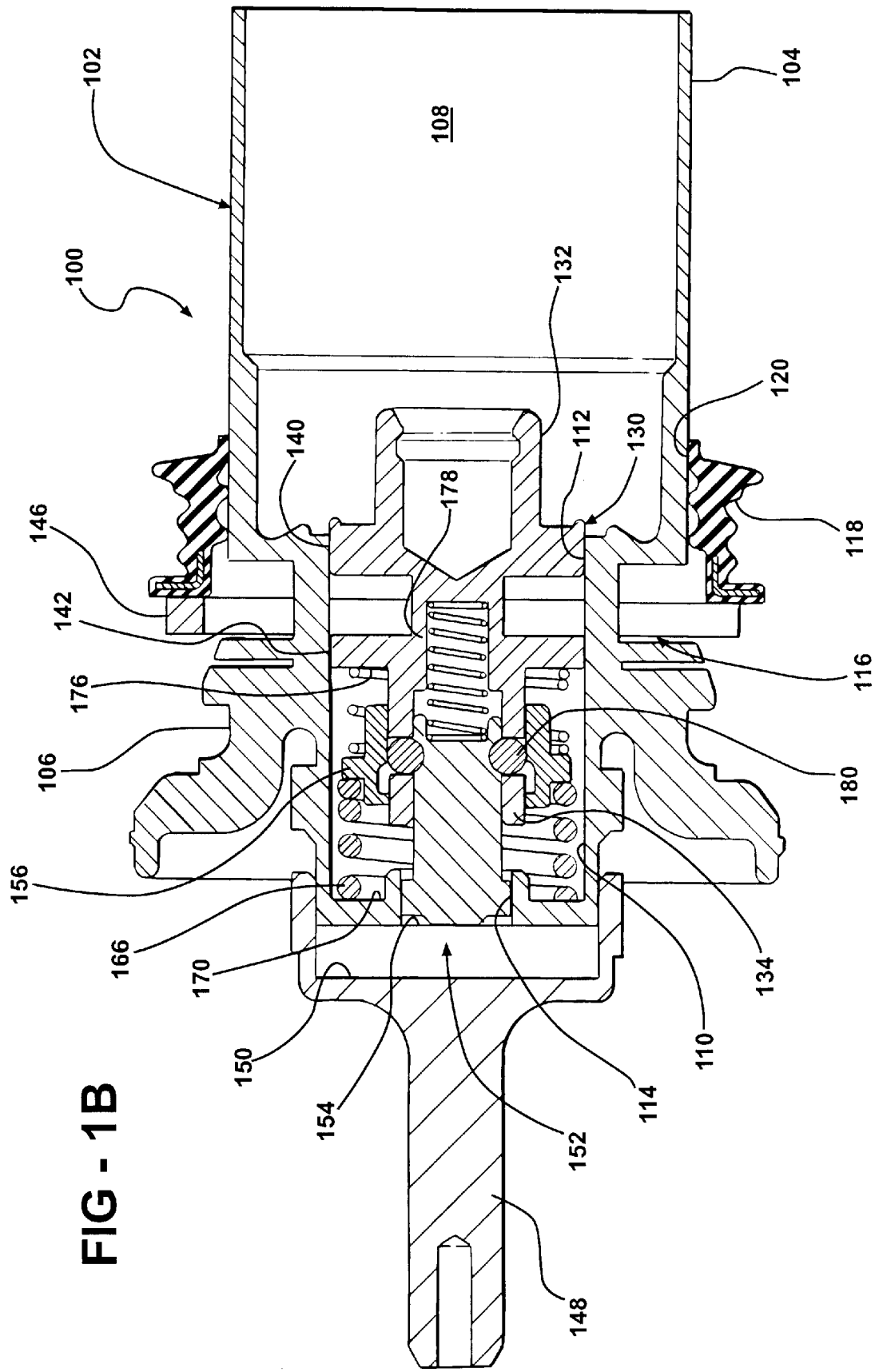
FIG. 1B is a two-dimensional cut-away view of the pneumatic brake booster of FIG. 1A*a;*
Figure 1C:
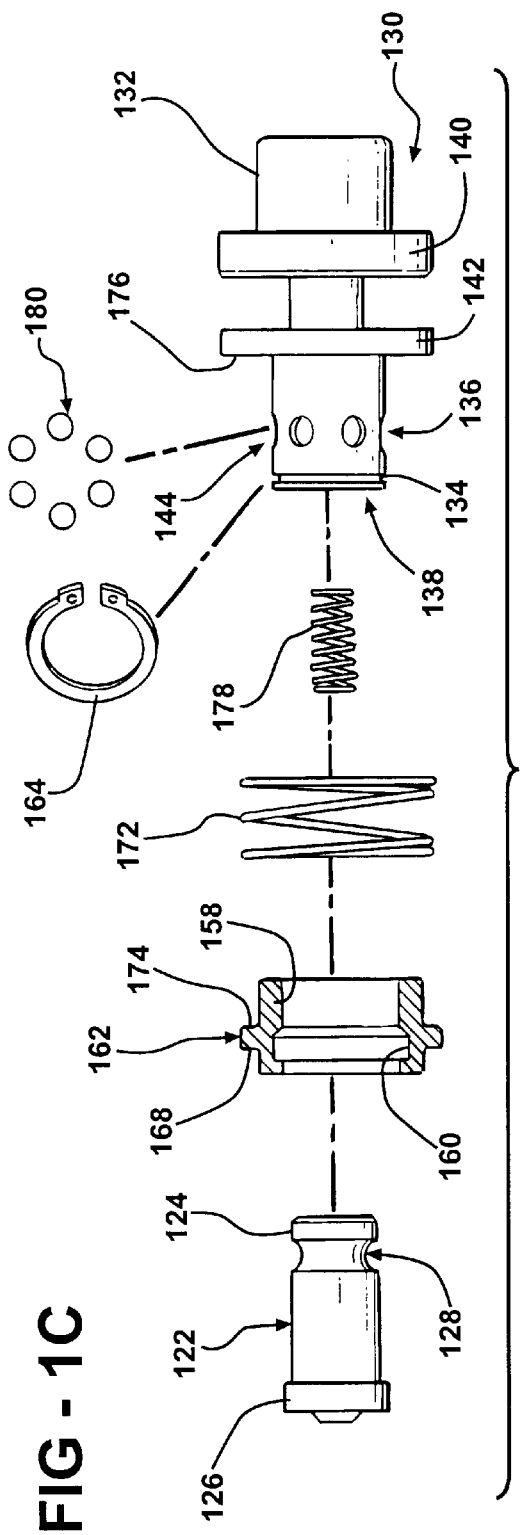
FIG. 1C is a diagrammatic illustration of a disassembled portion of the pneumatic brake booster of FIGS. 1A and 1B showing the parts disassembled.
Figure 1D:
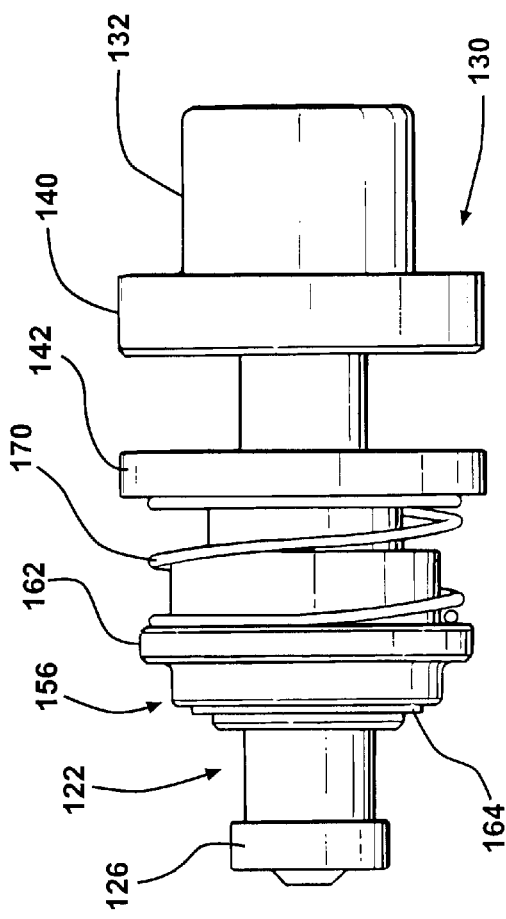
FIG. 1D is a diagrammatic illustration of a portion of the pneumatic brake booster of FIGS. 1A, 1B and 1C.

With reference to the drawings and in operation, the present invention provides a pneumatic brake booster 100. With specific reference to FIGS. 1A, 1B, 1C, and 1D, the pneumatic brake booster 100 includes a generally cylindrical shaped piston 102. Preferably, the piston 102 is made of plastic. The piston 102 has a first piston end 104 and a second piston end 106. The piston 102 defines a chamber 108 at the first piston end 104 and a piston bore 110 at the second piston end 106. The chamber 108 and the piston bore 110 are separated by an air flow aperture 112. The piston bore 110 includes a plunger aperture 114 located at the second piston end 106. The piston 102 also includes a plurality of key apertures 116 (as best can be seen in FIG. 1A). The key apertures 116 are located between the air flow aperture 112 and the plunger aperture 114.

A bearing 118 includes a bearing bore 120 which is adapted to receive the piston 102.

The pneumatic brake booster 100 also includes a plunger 122. The plunger 122 includes a first plunger end 124 and a second plunger end 126. The plunger 122 is moveable between first and second positions. The second plunger end 126 is located within the plunger aperture 114. The plunger 122 includes a plunger trench 128 which is located near the first plunger end 124.

An air valve 130 includes a first valve end 132 and a second valve end 134. The second valve end 134 includes a plurality of bearing apertures 136 and defines a valve bore 138. The valve bore 138 is adapted to receive the first plunger end 124. The air valve further includes first and second spaced apart radial valve elements 140, 142 located between the first and second valve ends 132, 134. The air valve 130 also includes a slot 144 located near the second valve end 134.

A generally u-shaped key 146 is inserted through the key apertures 116 of the piston 102. The key 146 intersects the air valve 130 between the first and second spaced apart radial valve elements 140, 142.

An output rod 148 is coupled to the second piston end 106. The output rod 148 defines an interior cavity 150. A rubber disk 152 is located within the interior cavity 150 of the output rod 148 and has an interior surface 154 which faces the plunger 122.

A sleeve 156 includes a sleeve bore 158 which is adapted to receive the second valve end 134. The sleeve 156 also includes a sleeve trench 160 located around an interior surface of the sleeve 156 and a ridge 162 on an exterior surface of the sleeve 156.

A retaining ring 164 has a generally C-shape and is fitted into the slot 144 on the air valve 130.

An abutment spring 166 is located within the piston bore 110 of the piston 102 between a first edge 168 of the sleeve ridge 162 and an interior surface 170 located near the plunger aperture 114.

A sleeve spring 172 is located within the piston bore 110 between a second edge 174 of the ridge and an interior edge 176 of the second radial valve element 142.

A collapsing spring 178 is located within the valve bore 138 and is adapted to couple the air valve 130 and the plunger 122.

A plurality of ball bearings 180 are located within the bearing apertures 136 and are adapted to fit, alternatively, in the plunger trench 128 and the sleeve trench 160.

Figure 2A:
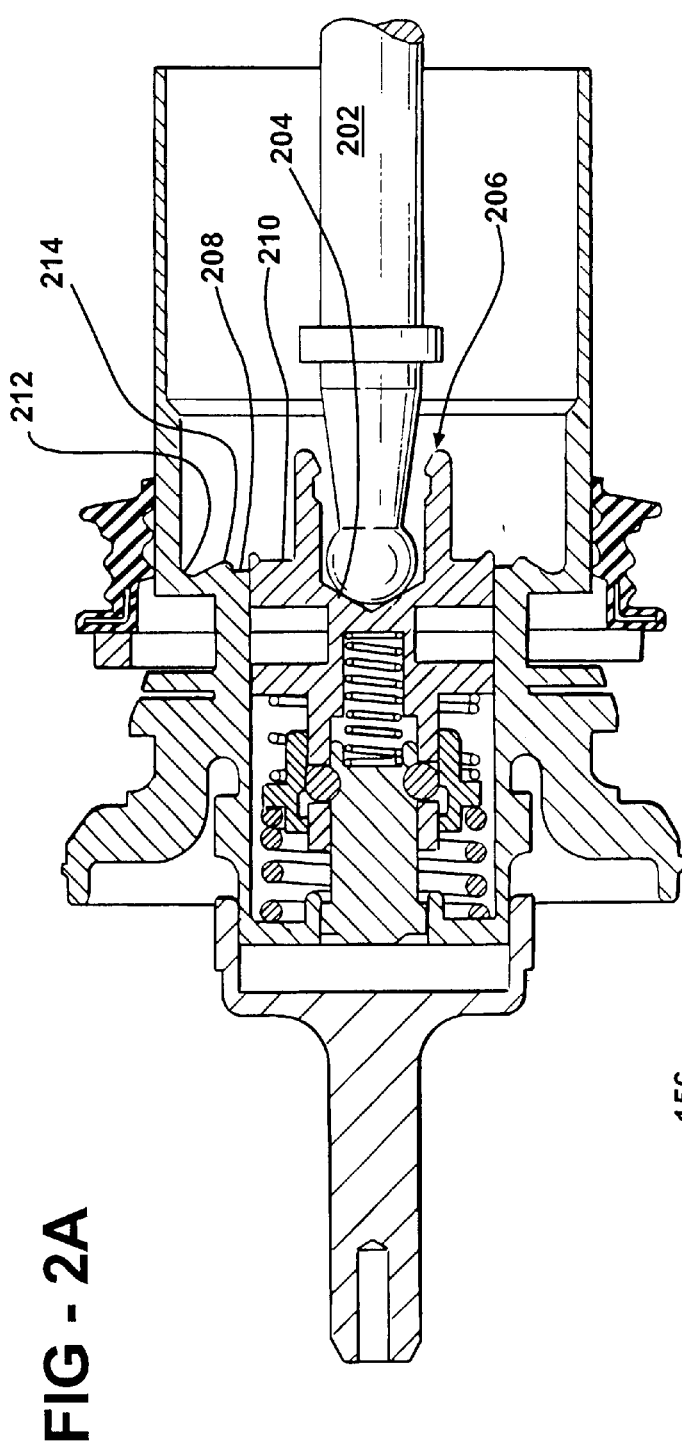
FIG. 2A is a cut-away view of the pneumatic brake booster of FIGS. 1A through 1D in an at-rest mode.
Figure 2B:
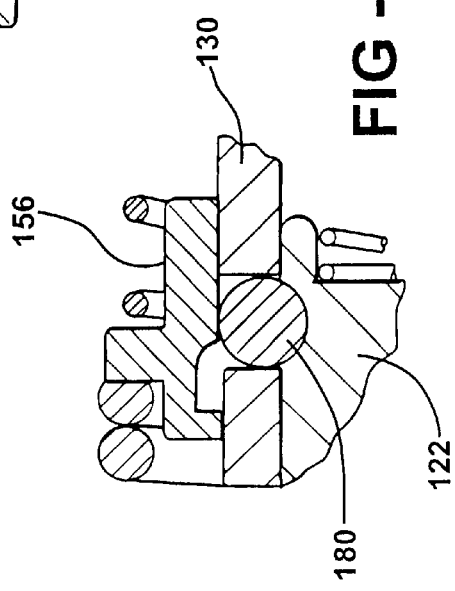
FIG. 2B is a partial illustration of the pneumatic brake booster of FIG. 2A.
Figure 2C:
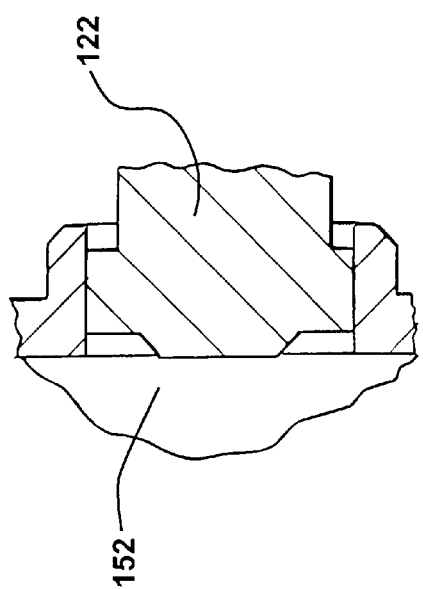
FIG. 2C is a second partial illustration of the pneumatic brake booster of FIG. 2A.

The status of the pneumatic brake booster 100 when in the at-rest mode or position is illustrated in FIGS. 2A, 2B, and 2C. An input rod 202 is shown within the chamber 108 and abutting an interior surface 204 of a second valve bore 206. The position of the key 146 is fixed relative to the piston 102 during rest mode. The piston 102 is at its rightmost position such that the key 146 abuts the bearing 118 causing the key to move toward the second piston end. The air valve 130 is also at its rightmost (toward to first end of the piston) position. A ridge 208 on an interior surface 210 of the first radial valve element 140 is positioned even with a ridge 212 on an interior surface 214 of the chamber 108, as shown. The air flow aperture 112 is closed and, thus, there exists a vacuum within both of the chambers (not shown) of the booster 100.

As shown in FIG. 2B, the plunger 122 is at its rightmost position and is exerting no force on the rubber disk 152. Returning to FIG. 2A, the sleeve spring 172 acts on the sleeve 156 and biases the sleeve 156 in direction away from the radial valve elements 140,142 (left in the drawing). In the at-rest position, the abutment spring is formed to exert no force on the sleeve 156 or a lower force than the sleeve spring 170. Thus, the ball bearings 180 are forced inward and into the plunger trench 128 (see FIG. 2C).

Figure 3A:
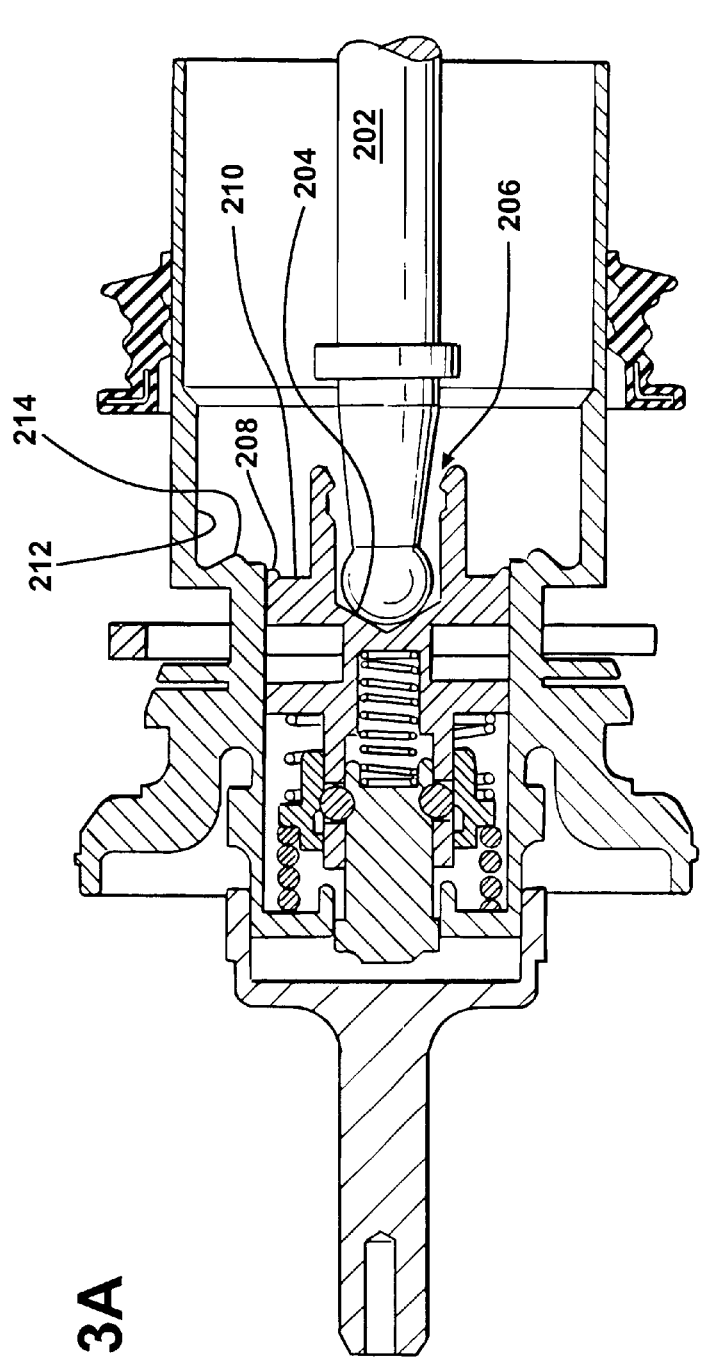
FIG. 3A is a cut-away illustration of the pneumatic brake booster of FIGS. 1A through 1D in a regular apply mode.
Figure 3C:
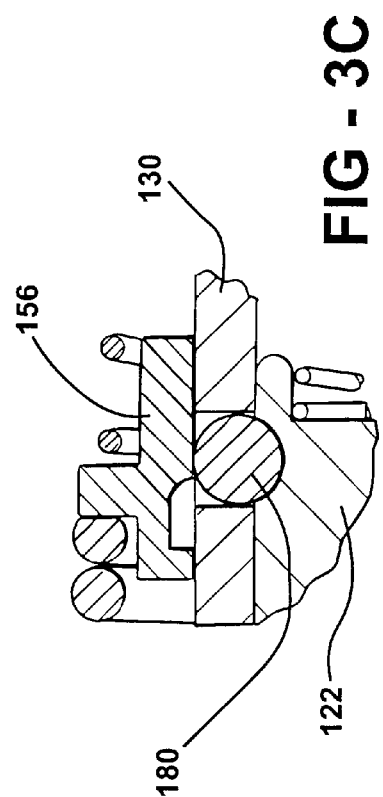
FIG. 3C is a second partial illustration of the pneumatic brake booster of FIG. 3A.
Figure 3B:
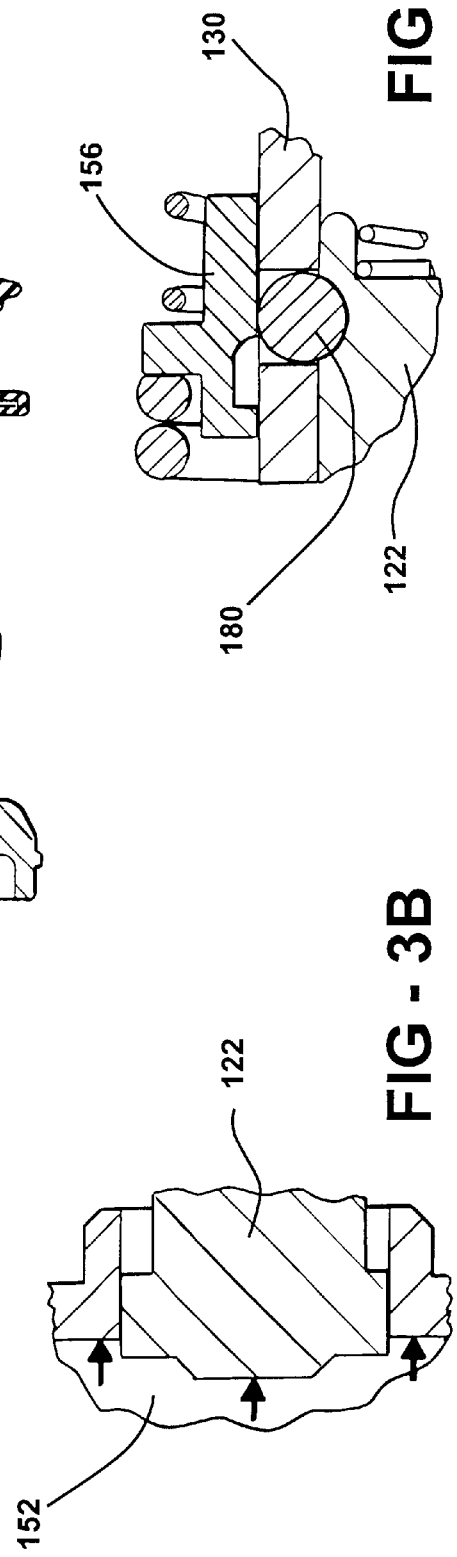
FIG. 3B is a partial illustration of the pneumatic brake booster of FIG. 3A.

The status of the pneumatic brake booster 100 when in the normal apply mode or position is illustrated in FIGS. 3A, 3B, and 3C. As shown, the input force ($F_{in}$) is applied to the input rod 202. When the input force overcomes the initial force of the booster 100, the input rod 202 moves in the direction of the input force. Typically, this distance is relatively small. As shown in FIGS. 3B and 3C, the ball bearings 180 remain in the plunger trench 128. The forces acting on the ball bearings 180 are indicated by the arrows. The plunger 122, likewise, is moved a short distance and exerts a force to the output rod 148 through the rubber disk 152.

The movement of the air valve 130 opens the air flow aperture 112, thereby pressurizing one of the chambers and creating a differential across the membrane (not shown). This creates a boost force which is added to the input force and applied to the output rod 148. The creation of the boost force is well known in the art and is therefore not further discussed.

As the booster 100 transitions from the at-rest mode to the regular apply mode, the feedback force increases, i.e., follows the input force at a ratio given by the booster calibration. A portion of the feedback force ($F_{out}$) is applied to the plunger 122 in the opposite direction of the input force. This rise in the output force helps maintain the ball bearings 180 in the plunger trench 128.

Figure 4A:
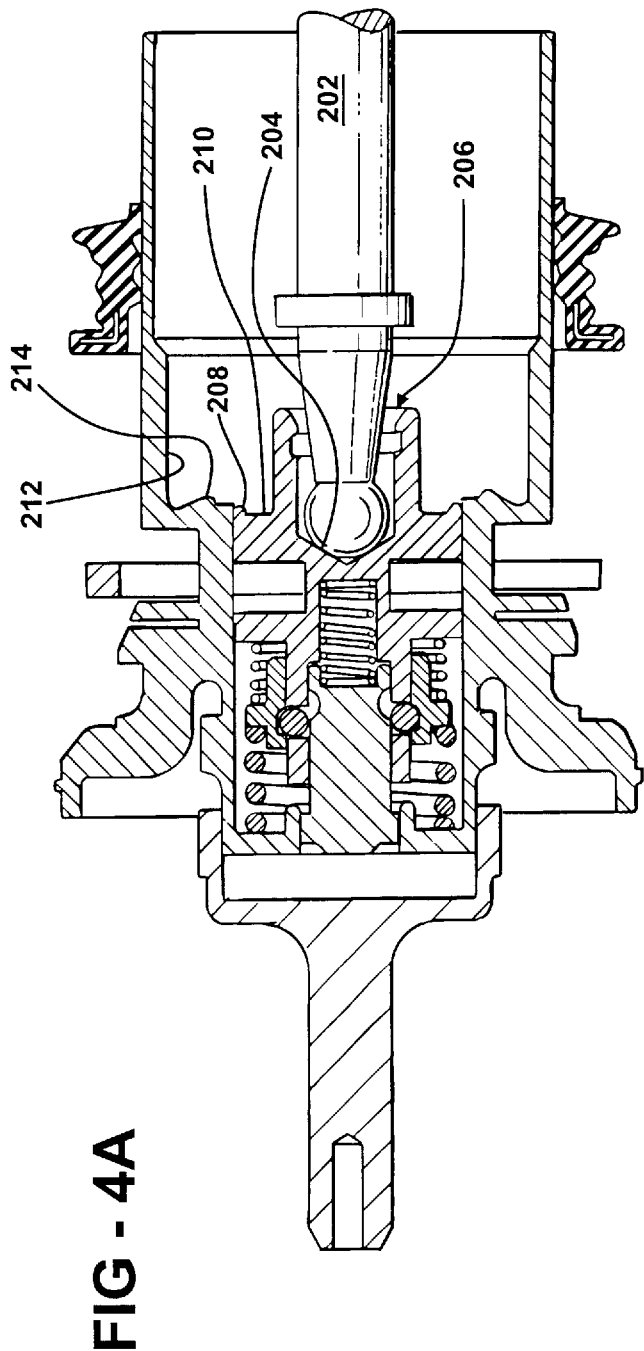
FIG. 4A is a cut-away illustration of the pneumatic brake booster of FIGS. 1A through 1D in a panic apply mode.
Figure 4C:
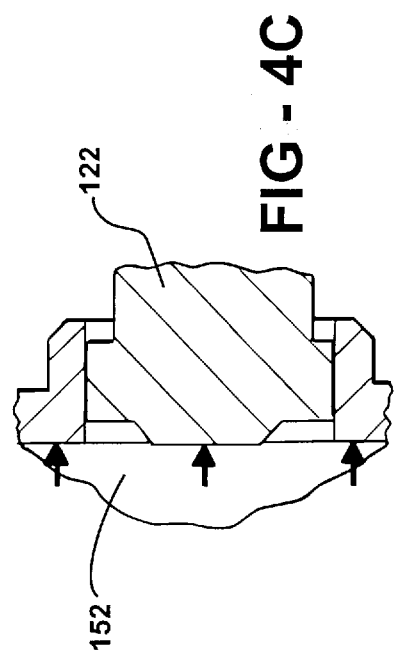
FIG. 4C is a second partial illustration of the pneumatic brake booster of FIG. 4A.
Figure 4B:
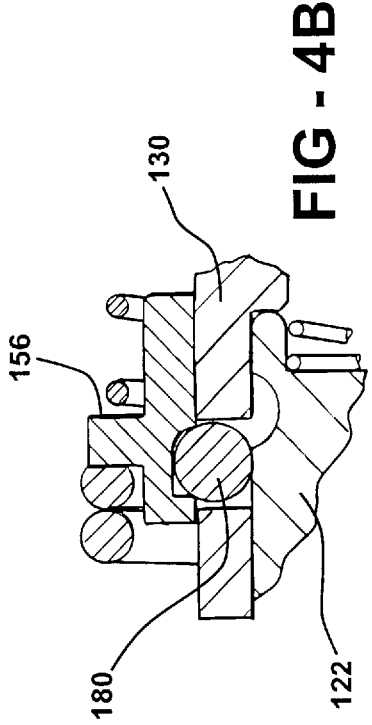
FIG. 4B is a partial illustration of the pneumatic brake booster of FIG. 4A.

If, however, the input force and input travel rises very quickly, i.e., faster than the output force increase, as in the condition of a very fast actuation of the brake pedal, the input force and travel acting on the plunger 122 combined with the force from the abutment spring 166 acting on the sleeve 162, acts to force the ball bearings 180 out of the plunger trench 128 and into the sleeve trench 160 (see FIGS. 4A, 4B, and 4C).

Figure 5:
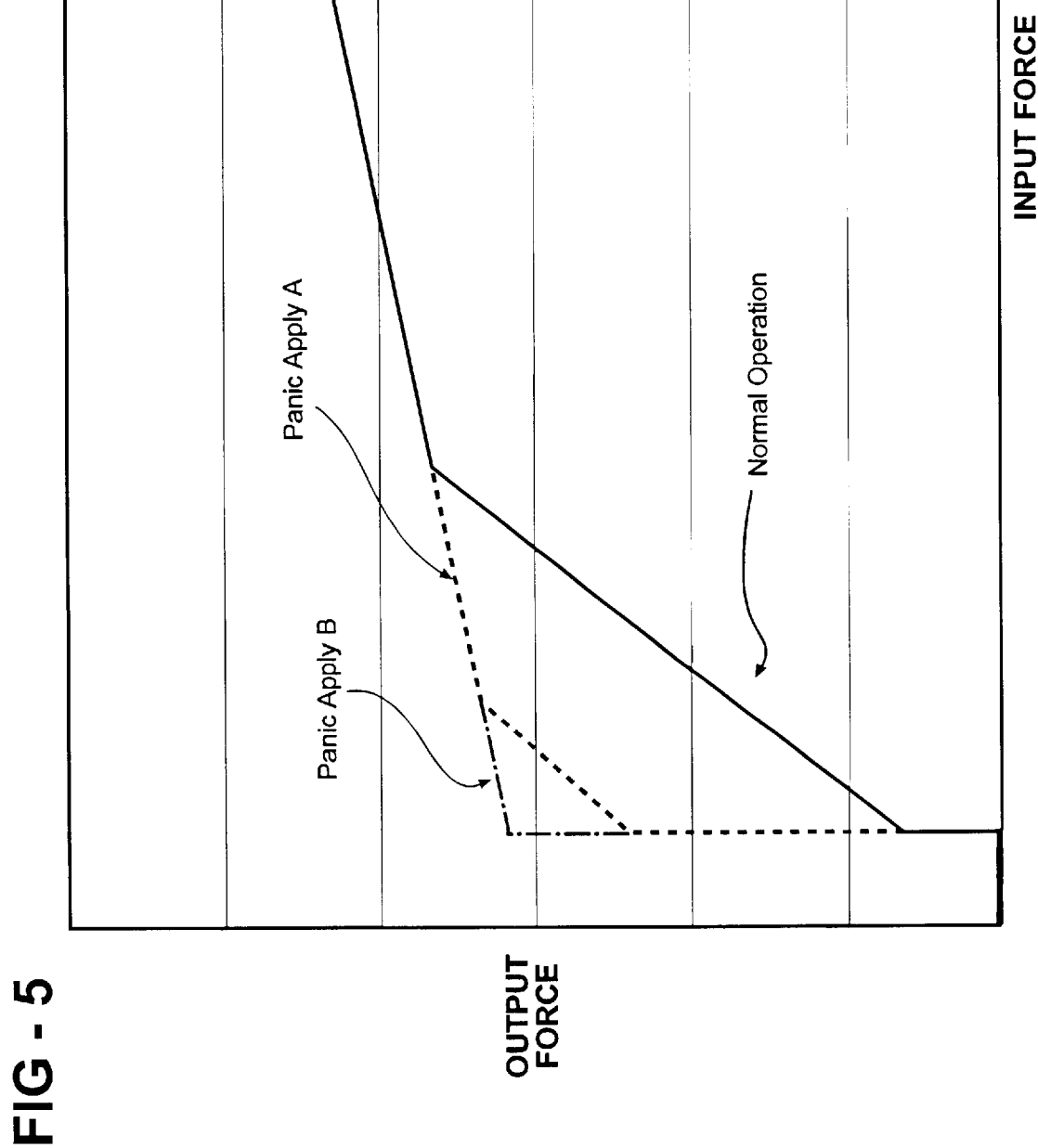
FIG. 5 is a chart showing the input/output curve of the present invention for both normal operation mode and panic mode.

Without the ball bearings 178, the plunger 122 collapses toward the air valve 130. This is illustrated geometrically in FIGS. 3A and 4A and physically in FIG. 5. In FIG. 3A, the ball bearings 178 are positioned in the plunger trench 128 and maintain a predetermined distance between the first plunger end 124 and a surface of the air valve 130, as shown. In FIG. 4A, distance between the first plunger end 130 and the air valve 130 is eliminated and the first plunger end 124 abuts the air valve 130. Thus, the feedback force applied to the push rod 148 is reduced as shown in FIG. 5, panic apply A or eliminated as shown in FIG. 5, panic apply B (i.e. feedback force is reduced by an amount determined by the predetermined distance). Therefore during an emergency condition, the feedback force is reduced (and possibly eliminated given the predetermined distance moves toward infinity) thereby improving the force required of the driver and thus improving the stopping distance as compared to the regular apply mode or position.

Other aspects, objects and advantages of this invention can be obtained from a study of the drawings, the disclosure and the appended claims.

What is claimed is:

1. A pneumatic brake booster, comprising:
   a generally cylindrical shaped piston having a first piston end and a second piston end and defining a chamber at the first piston end and a piston bore at the second piston end separated by an air flow aperture, the piston bore having a plunger aperture located at the second piston end;
   a plunger having a first plunger end and a second plunger end and being movable between first and second positions, the second plunger end being located within the plunger aperture;
   an air valve having a first valve end and a valve second end and being movable between first and second positions and defining a valve bore for receiving the first plunger end; and,
   a collapsing spring within the valve bore and being adapted to couple the plunger and the air valve, wherein the plunger and air valve are spaced apart a first relative distance in response to the pneumatic brake booster being in a regular apply mode in which output of the pneumatic brake booster is determined by a first curve and spaced apart a second relative distance in response to the pneumatic brake booster being in a panic apply mode in which output of the pneumatic brake booster is determined by a second curve.

2. A pneumatic brake booster, as set forth in claim 1, further comprising a push rod having an interior cavity and being coupled to the second piston end.

3. A pneumatic brake booster, as set forth in claim 2, further comprising a rubber disk located within the interior cavity of the output rod and having an interior surface facing the plunger.

4. A pneumatic brake booster, as set forth in claim 1, further comprising a bearing having a bearing bore adapted to receive the piston.

5. A pneumatic brake booster, as set forth in claim 4, wherein the air valve includes first and second spaced apart radial valve elements located between the first and second valve ends.

6. A pneumatic brake booster, as set forth in claim 5, wherein the piston includes key apertures located between the air flow aperture and the plunger aperture, and wherein the pneumatic brake booster further comprises a generally u-shaped key inserted through the key apertures, the key intersecting the air valve between the first and second spaced apart radial valve elements.

7. A pneumatic brake booster, as set forth in claim 1, wherein the pneumatic brake booster is movable, in response to an input force, between an at-rest mode, the regular apply mode and the panic apply mode and wherein a portion of the feedback force is applied to the air valve when the pneumatic air booster is in the regular apply mode and a lesser portion of the feedback force is applied to the air valve when the pneumatic air booster is in the panic apply mode.

8. A pneumatic brake booster, comprising:
   a generally cylindrical shaped piston having a first piston end and a second piston end and defining a chamber at the first piston end and a piston bore at the second piston end separated by an air flow aperture, the piston bore having a plunger aperture located at the second piston end;
   a plunger having a first plunger end and a second plunger end and being movable between first and second positions, the second plunger end being located within the plunger aperture;
   an air valve having a first valve end and a valve second end and being movable between first and second positions and defining a valve bore for receiving the first plunger end; and,
   a collapsing spring within the valve bore and being adapted to couple the plunger and the air valve, wherein the plunger and air valve are spaced apart a first relative distance in response to the pneumatic brake booster being in a regular apply mode and spaced apart a second relative distance in response to the pneumatic brake booster being in a panic apply mode, wherein the plunger includes a plunger trench near the first plunger end, and wherein the pneumatic brake booster further includes:
   a sleeve having a sleeve bore for receiving the second valve end and having a sleeve trench located around an interior surface of the sleeve; and,
   at least one ball bearing located within a bearing aperture in the air valve and being adapted to fit, alternatively, in the plunger trench and the sleeve trench.

9. A pneumatic brake booster, comprising:
   a generally cylindrical shaped piston having a first piston end and a second piston end and defining a chamber at the first piston end and a piston bore at the second piston end separated by an air flow aperture, the piston bore having a plunger aperture located at the second piston end;

a plunger having a first plunger end and a second plunger end and being movable between first and second positions, the second plunger end being located within the plunger aperture;

an air valve having a first valve end and a valve second end and being movable between first and second positions and defining a valve bore for receiving the first plunger end; and, a collapsing spring within the valve bore and being adapted to couple the plunger and the air valve, wherein the plunger and air valve are spaced apart a first relative distance in response to the pneumatic brake booster being in a regular apply mode and spaced apart a second relative distance in response to the pneumatic brake booster being in a panic apply mode; and, a sleeve having a sleeve bore for receiving the second valve end, a sleeve trench located around an interior surface of the sleeve, and a ridge on an exterior surface of the sleeve.

10. A pneumatic brake booster, as set forth in claim 9, further comprising an abutment spring being located within the piston bore and between an edge of the ridge and the plunger aperture.

11. A pneumatic brake booster, as set forth in claim 9, further comprising a sleeve spring being located within the piston bore and between an edge of the ridge on the sleeve and an edge of the air valve.

12. A pneumatic brake booster, comprising:

a generally cylindrical shaped piston having a first piston end and a second piston end and defining a chamber at the first piston end and a piston bore at the second piston end separated by an air flow aperture, the piston bore having a plunger aperture located at the second piston end;

a plunger having a first plunger end and a second plunger end and being movable between first and second positions, the second plunger end being located within the plunger aperture;

an air valve having a first valve end and a valve second end and being movable between first and second positions and defining a valve bore for receiving the first plunger end; and, a collapsing spring within the valve bore and being adapted to couple the plunger and the air valve, wherein the plunger and air valve are spaced apart a first relative distance in response to the pneumatic brake booster being in a regular apply mode and spaced apart a second relative distance in response to the pneumatic brake booster being in a panic apply mode, wherein the air valve includes a slot located at the second valve end and the pneumatic brake booster further comprises a retaining ring having a generally C shape and being fitted into the slot on the air valve.

13. A pneumatic brake booster, comprising:

a generally cylindrical shaped piston having a first piston end and a second piston end and defining a chamber at the first piston end and a piston bore at the second piston end separated by an air flow aperture, the piston bore having a plunger aperture located at the second piston end;

a plunger having a first plunger end and a second plunger end and being movable between first and second positions, the second plunger end being located within the plunger aperture;

an air valve having a first valve end and a valve second end and being movable between first and second positions and defining a valve bore for receiving the first plunger end; and, a collapsing spring within the valve bore and being adapted to couple the plunger and the air valve, wherein the plunger and air valve are spaced apart a first relative distance in response to the pneumatic brake booster being in a regular apply mode and spaced apart a second relative distance in response to the pneumatic brake booster being in a panic apply mode, wherein the air valve includes a bearing aperture located near the second end of the air valve and the pneumatic brake booster further comprises a plurality of ball bearings located within the bearing aperture and being adapted to fit, alternatively, in a plunger trench and a sleeve trench.

14. A pneumatic brake booster, comprising:

a generally cylindrical shaped piston having a first piston end and a second piston end and defining a chamber at the first piston end and a piston bore at the second piston end separated by an air flow aperture, the piston bore having a plunger aperture located at the second piston end;

a plunger having a first plunger end and a second plunger end and being movable between first and second positions, the second plunger end being located within the plunger aperture, the plunger including a plunger trench near the first end of the plunger;

an air valve having a first valve end and a second valve end, the second valve end having a bearing aperture and defining a valve bore for receiving the first plunger end;

a sleeve having a sleeve bore for receiving the second valve end and having a sleeve trench located around an interior surface of the sleeve; and, at least one ball bearing located within the bearing aperture and being adapted to fit, alternatively, in the plunger trench and the sleeve trench.

15. A pneumatic brake booster, as set forth in claim 14, wherein the pneumatic brake booster is movable, in response to an input force, between an at-rest position, a regular apply position and a panic apply position and wherein a portion of a feedback force is applied to the air valve when the pneumatic air booster is in the regular apply position and a lesser portion of the feedback force is applied to the air valve when the pneumatic air booster is in the panic apply position.

16. A pneumatic brake booster, as set forth in claim 14, further comprising a bearing having a bearing bore adapted to receive the piston.

17. A pneumatic brake booster, as set forth in claim 14, wherein the air valve includes first and second spaced apart radial valve elements located between the first and second valve ends.

18. A pneumatic brake booster, as set forth in claim 17, wherein the piston includes key apertures located between the air flow aperture and the plunger aperture, and wherein the pneumatic brake booster further comprises a generally u-shaped key inserted through the key apertures, the key intersecting the air valve between the first and second spaced apart radial valve elements.

19. A pneumatic brake booster, as set forth in claim 14, further comprising a push rod having an interior cavity and being coupled to the second end of the piston.

20. A pneumatic brake booster, as set forth in claim 19, further comprising a rubber disk located within the interior cavity of the output rod and having an interior surface facing the plunger.

21. A pneumatic brake booster, as set forth in claim 14, wherein the sleeve includes a ridge on an exterior surface of the sleeve.

22. A pneumatic brake booster, as set forth in claim 21, further comprising an abutment spring being located within the piston bore and between the ridge on the sleeve and the plunger aperture.

23. A pneumatic brake booster, as set forth in claim 21, further comprising a sleeve spring being located within the piston bore and between an edge of the ridge on the sleeve and an edge of the air valve.

24. A pneumatic brake booster, as set forth in claim 14, wherein the air valve includes a slot located at the second valve end and the pneumatic brake booster further comprises a retaining ring having a generally C shape and being fitted into the slot on the air valve.

25. A pneumatic brake booster, as set forth in claim 14, further comprising a collapsing spring within the valve bore and being adapted to couple the plunger and the air valve.

26. A pneumatic brake booster, comprising:
- a generally cylindrical shaped piston having a first piston end and a second piston end and defining a chamber at the first piston end and a piston bore at the second piston end separated by an air flow aperture, the piston bore having a plunger aperture located at the second piston end, the piston further including key apertures located between the air flow aperture and the plunger aperture;
- a bearing having a bearing bore adapted to receive the piston;
- a plunger having a first plunger end and a second plunger end and being movable between first and second positions, the second plunger end being located within the plunger aperture, the plunger including a plunger trench near the first plunger end;
- an air valve having a first valve end and a second valve end, the first valve end having a plurality of bearing apertures and defining a valve bore for receiving the first plunger end, the air valve further including first and second spaced apart radial valve elements located between the first and second valve ends and a slot located near the second valve end;
- a generally u-shaped key inserted through the key apertures, the key intersecting the air valve between the first and second spaced apart radial valve elements;
- a push rod having an interior cavity and being coupled to the second piston end;
- a rubber disk located within the interior cavity of the output rod and having an interior surface facing the plunger;
- a sleeve having a sleeve bore for receiving the first valve end, a sleeve trench located around an interior surface of the sleeve, and a ridge on an exterior surface of the sleeve;
- a retaining ring having a generally C shape and being fitted into the slot on the air valve;
- an abutment spring being located within the piston bore and between a first edge of the ridge on the sleeve and the plunger aperture;
- a sleeve spring being located within the piston bore and between a second edge of the ridge on the sleeve and an interior edge of the second radial valve element;
- a collapsing spring located within the valve bore and being adapted to couple the air valve and the plunger; and,
- a plurality of ball bearings located within the bearing apertures and being adapted to fit, alternatively, in the plunger trench and the sleeve trench.

27. A pneumatic brake booster, as set forth in claim 26, wherein the pneumatic brake booster is movable between an at-rest position, a regular apply position and a panic apply position and wherein a portion of the feedback force is applied to the air valve when the pneumatic air booster is in the regular apply position and a lesser portion of the feedback force is applied to the air valve when the pneumatic air booster is in the panic apply position.

28. A pneumatic brake booster, as set forth in claim 26, wherein the plurality of ball bearings are fitted in the plunger trench when the pneumatic air booster is in the regular apply position.

29. A pneumatic brake booster, as set forth in claim 26, wherein the plurality of ball bearings are fitted in the sleeve trench when the pneumatic air booster is in the panic apply position.

* * * * *